(12) United States Patent
Vaysman

(10) Patent No.: US 10,282,734 B2
(45) Date of Patent: May 7, 2019

(54) AUTHENTICATION OF ARTICLES OF MANUFACTURE

(71) Applicant: Aintu Inc., Sunnyvale, CA (US)

(72) Inventor: Arthur Vaysman, San Jose, CA (US)

(73) Assignee: Aintu Inc., Sunnyvale, CA (US)

( * ) Notice: Subject to any disclaimer, the term of this patent is extended or adjusted under 35 U.S.C. 154(b) by 0 days.

(21) Appl. No.: 15/636,374

(22) Filed: Jun. 28, 2017

(65) Prior Publication Data

US 2017/0372328 A1 Dec. 28, 2017

Related U.S. Application Data

(60) Provisional application No. 62/355,831, filed on Jun. 28, 2016.

(51) Int. Cl.
*G06Q 30/00* (2012.01)
*G06K 7/10* (2006.01)
*G06K 7/14* (2006.01)

(52) U.S. Cl.
CPC ..... *G06Q 30/0185* (2013.01); *G06K 7/10722* (2013.01); *G06K 7/1413* (2013.01)

(58) Field of Classification Search
CPC ............. H04L 9/3247; G06K 9/00577; G06K 9/00442; G06K 7/1417
See application file for complete search history.

(56) References Cited

U.S. PATENT DOCUMENTS

| | | | |
|---|---|---|---|
| 2007/0056041 A1* | 3/2007 | Goodman | H04L 9/3247 726/26 |
| 2009/0088203 A1* | 4/2009 | Havens | G06K 7/10881 455/556.1 |
| 2015/0213238 A1* | 7/2015 | Farha | G06F 21/10 726/30 |
| 2015/0242668 A1* | 8/2015 | Hattersley | H04M 1/72594 704/260 |
| 2017/0022547 A1* | 1/2017 | Chan | C12Q 1/6825 |

\* cited by examiner

*Primary Examiner* — Edward Park
(74) *Attorney, Agent, or Firm* — HM Law Group LLP; Vani Moodley, Esq.

(57) ABSTRACT

An authentication system configured to identify counterfeit articles. The authentication system configured to capture and scan an optical code engraved on an artifact, decode the optical code to determine a unique code associated with an article, transmitting the unique code to the authentication server and receiving a result of authentication from the authentication server to verify the authenticity of the article being scanned.

6 Claims, 3 Drawing Sheets

AUTHENTICATION OF ARTICLES OF MANUFACTURE

TECHNICAL FIELD

Embodiments of the present invention relates to the authentication of articles of manufacture such as jewelry in the form of watches and rings.

BACKGROUND OF THE INVENTION

Articles of manufacture are often counterfeited and sold to unsuspecting customers as genuine articles. Expensive articles such as watches, handbags, shoes and jewelry of various design houses are easily counterfeited and it is very difficult for the average consumer to identify the counterfeit. Various methods have been used to circumvent the aforementioned counterfeit problem such as a certificate of authenticity is included with the article of manufacture in order to vouch for "authenticity" of said article of manufacture. Other methods include optical holograms that were used as a mark for authenticity. However, in certain cases the certificate of authenticity or hologram itself is faked. Therefore, an efficient and effective method is required to determine the authenticity of the products as opposed to counterfeits.

SUMMARY

In one aspect of the invention, there is provided techniques and apparatus for authenticating articles of manufacture such as watches, rings, and the like. In accordance with the techniques, the article of manufacture is provided with a tamperproof artifact which may be scanned through electronic means by a consumer at the time of purchase, in order to verify the authenticity of the article of manufacture. Advantageously, the artifact is embedded physically into the article of manufacture at a location that makes the artifact invisible when the article of manufacture is worn. Thus, the aesthetic attractiveness of the article of manufacture is not destroyed by the presence of the artifact.

For purposes of authentication, the article of manufacture bears an optical code that may be scanned by a camera of a mobile phone. The mobile phone is provisioned with an application configured to engage in an authentication operation whereby the optical code is decoded and verified as belonging to an authentic product. Advantageously, the authentication operation supports a lookup of a private database of authentic products.

Because of the dimensions of the article of manufacture, and the requirement of keeping the artifact small so as not to disrupt the aesthetic beauty of the article of manufacture, the artifact and hence the optical code that it bears may be too small to be scanned/photographed using just the camera of a standard mobile phone. Thus, in one embodiment of the invention, a camera attachment is provided that includes an optical magnification system to enable the artifact to be imaged at a sufficient resolution to enable the optical code to be decoded.

Other aspects of the invention will be apparent from the detailed description below.

DETAILED DESCRIPTION OF THE INVENTION

In the following description, for purposes of explanation, numerous specific details are set forth in order to provide a thorough understanding of the invention. It will be apparent, however, to one skilled in the art that the invention may be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purpose of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features may be provided independently of other features. Accordingly, this description of the invention is set forth without any loss of generality to, and without imposing limitations upon, the invention.

Figure 1:
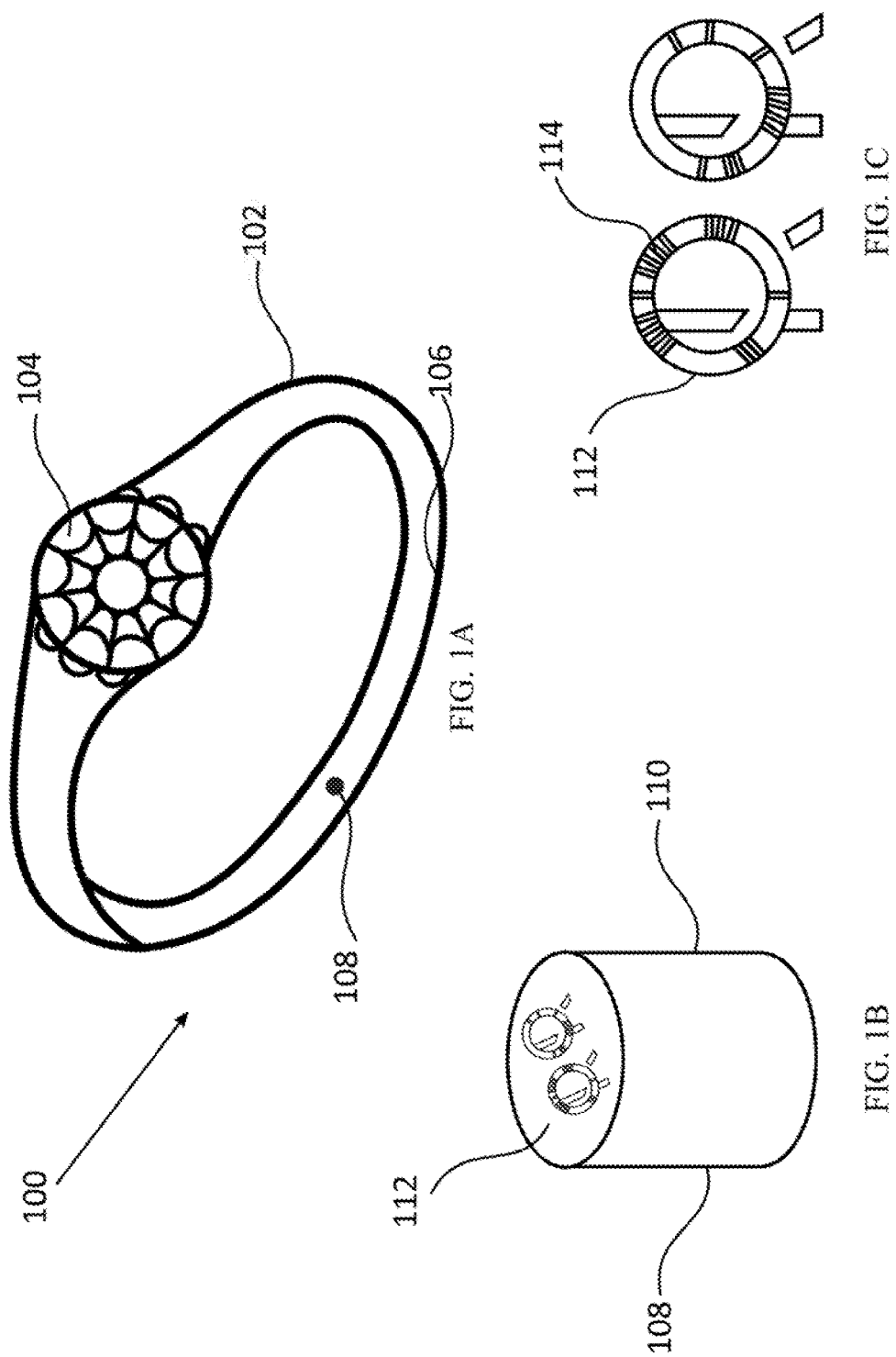
FIGS. 1A, 1B and 1C show an article of manufacture in the form of a wedding ring embedded with an artifact, in accordance with one embodiment of the invention

According to FIG. 1A, an article of manufacture is provided in the form of a diamond ring 100. As will be seen, the ring 100 includes a band 102 on which is mounted a cluster of diamonds 104. The band 102 includes an inner surface 106 which bears an artifact 108. The artifact 108 may be seen in greater detail in FIG. 1B. As will be seen, the artifact 108 includes a cylindrical body 110 which bears an optical code 112 on an operatively upper surface thereof. The optical code may be engraved into the material of the artifact 108. The size of the engraved optical code is small and is not visible to human eye. Various materials may be used to form the artifact. For example, in one embodiment, in the case where the band 102 is made of gold, the artifact 108 may take the form of a steel pellet. This gives the artifact 108 sufficient wear characteristics to be long-lasting.

According to FIG. 1C, the optical code 112 is provided in greater detail. The optical code 112 comprises a series of markings 114 which include encoded information. The encoded information may be a unique number generated within a sufficiently large number space so as to reduce the likelihood of a unique number being guessed by counterfeiter. Various encoding methods may be used known in the art.

Figure 2:
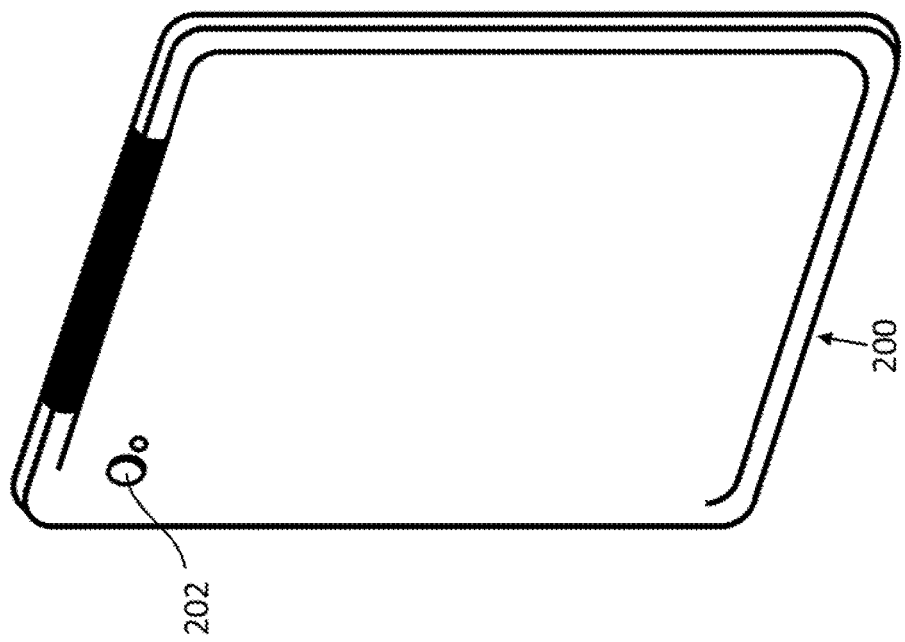
FIG. 2 shows a mobile phone equipped with a lens to enable the capturing of images.

For reading/scanning the optical code 112 a mobile phone of a consumer will be used. According to FIG. 2 one such phone 200, which includes a lens 202 associated with a camera included in the phone 200 is shown. Because of the small size of the artifact 108 and its positioning within the band 102 as shown in FIG. 1A, it is difficult to use the lens 202 in order to scan/read the optical code 112. In particular, it is difficult to bring the lens 202 into close proximity with the optical code 112. In order to overcome this problem, in accordance with one embodiment of the invention, a camera attachment is provided.

Figure 3:
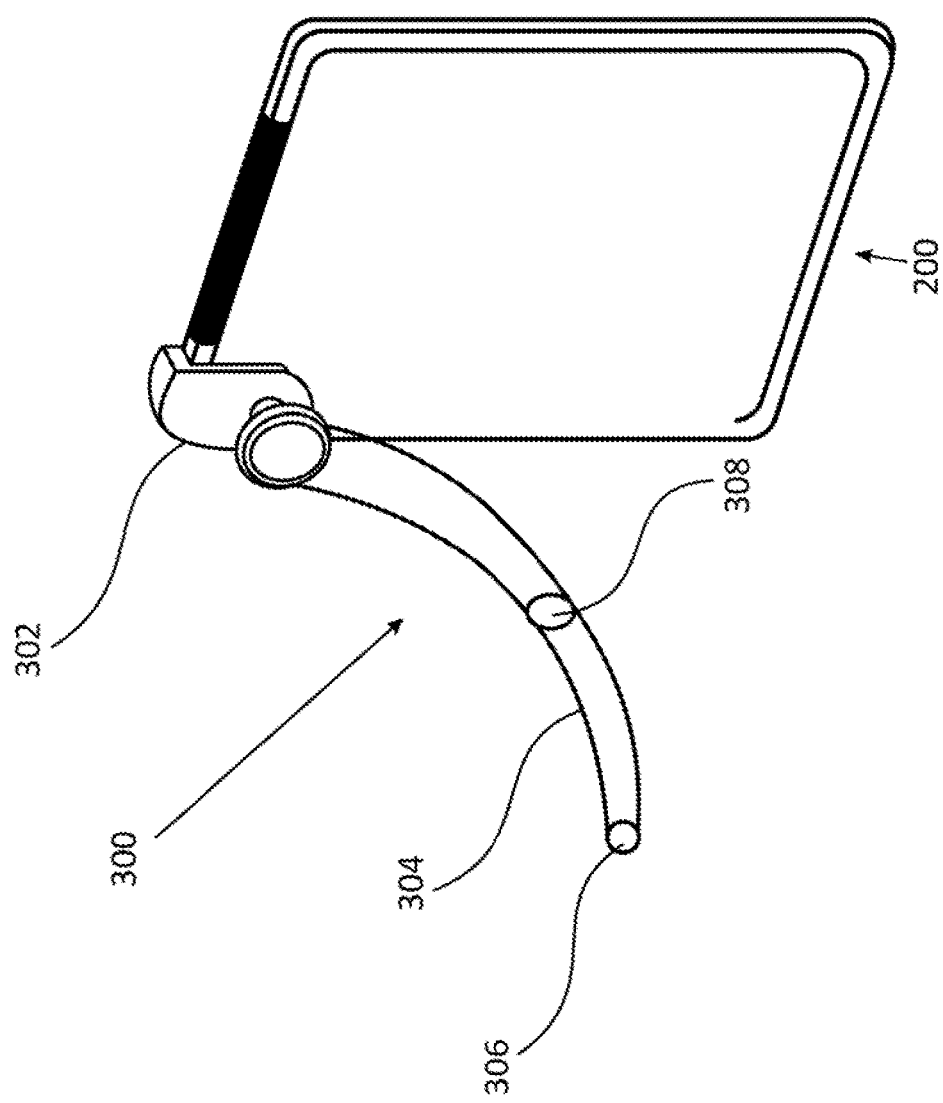
FIG. 3 shows a camera attachment for use with the mobile phone of FIG. 2 when imaging the artifact of FIG. 1, in accordance with one embodiment of the invention.

According to FIG. 3, a camera attachment 300 is shown. The camera attachment 300 includes a mount 302 by which the device is physically attached to the mobile phone 307. The mount 302 supports an elongated neck 304 which includes an eyepiece 306 and internal optics 308. In use, the neck 304 is used to bring eyepiece 306 into close proximity with the artifact 108 as shown in FIG. 1A, so that the optical code 112 may be imaged, scanned or read through the eyepiece 306. The internal optics 308 may define an optical magnification system whereby the optical code 112 may be magnified sufficiently to enable decoding of the optical code.

In an embodiment, the camera attachment 300 captures an image of the optical code 112. An authentication application may be used to control the camera of the phone. The authentication application may be configured to decode the optical code 112 in the image captured and to transmit the unique identifier represented by the optical code to a private central database for purposes of authenticating the code. Various decoding methods may be used known in the art. Alternatively, the authentication application may be configured to transmit the optical code to an authentication server for authentication in conjunction with said private central database.

In an embodiment, the authentication server may include a database which may include a list of unique codes associated with authentic artifacts or article of manufacture. The authentication server may verify the decoded unique code received from the authentication application with the list of unique codes and verify the authenticity of the artifacts or article of manufacture. The authentication server may then transmit a signal indicating the authenticity of article being scanned for example in this case the diamond ring 100 as shown in FIG. 1A. In case the unique code received by the authentication server does not match with any of the unique codes in the list of unique codes. The authentication server me transmit a signal of warning to the authentication application. The authentication application may in turn sound an alarm to alert a user that the article of manufacture being scanned is a counterfeit.

In an embodiment, the authentication application on receiving the result of authenticity from the authentication server may display the result on a display screen.

In an embodiment, the features/functions of authentication application and authentication server described above may be implemented as modules. As used herein, the term "module" may describe a given unit of functionality that may be performed in accordance with one or more embodiments of the present invention. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality. Where components or modules of the invention are implemented in whole or in part using software, in one embodiment, these software elements may be implemented to operate with a computing or processing module capable of carrying out the functionality described with respect thereto. After reading this description, it will become apparent to a person skilled in the relevant art how to implement the invention using other computing modules or architectures. Modules may be implemented using a general-purpose or special-purpose processing engine such as, for example, a microprocessor, controller, or other control logic. In the illustrated example, the modules could be connected to a bus, although any communication medium may be used to facilitate interaction with other components of computing modules or to communicate externally.

In an embodiment, the authentication server may also include one or more memory modules, simply referred to herein as main memory. For example, preferably random access memory (RAM) or other dynamic memory may be used for storing information and instructions to be executed by processor. Main memory may also be used for storing temporary variables or other intermediate information during execution of instructions to be executed by processor. Computing module may likewise include a read only memory ("ROM") or other static storage device coupled to bus for storing static information and instructions for processor.

The database module may include, for example, a media drive and a storage unit interface. The media drive may include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive may be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media may include a computer usable storage medium having stored therein computer software or data.

In alternative embodiments, the database module may include other similar instrumentalities for allowing computer programs or other instructions or data to be loaded into computing module. Such instrumentalities may include, for example, a fixed or removable storage unit and an interface. Examples of such storage units and interfaces may include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

The communications module may include various communications interfaces such as an Ethernet, network interface card, WiMedia, IEEE 802.XX or other interface), or other communications interface. Data transferred via communications interface may typically be carried on signals, which can be electronic, electromagnetic (which includes optical) or other signals capable of being exchanged by a given communications interface. These signals may be provided to communications interface via a channel. This channel may carry signals and may be implemented using a wired or wireless communication medium. Some examples of a channel may include a phone line, a cellular link, an RF link, an optical link, a network interface, a local or wide area network, and other wired or wireless communications channels.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. An authentication system comprising:
one or more processors communicably connected to an authentication server configured to:
capture and scan an optical code engraved on an artifact in the form of a steel pellet embedded in an article of manufacture, and wherein the optical code is captured and scanned by a phone camera using a camera lens attachment comprising an elongated neck in order to bring an eyepiece in close proximity with the artifact;
decode the optical code to determine a unique code associated with the article of manufacture;
transmit the unique code to the authentication server; and
receive a result of authentication from the authentication server.

2. The authentication system according to claim 1, wherein the unique code is encoded in the form of markings engraved on the artifact.

3. The authentication system according to claim 1, wherein the camera lens attachment comprises lens assembly to magnify the optical code.

4. The authentication system according to claim 3, wherein the determined unique code is compared from a predefined list of unique codes stored in a database.

5. An authenticating method comprising:
in a computing device communicable connected to an authentication server:
capturing and scanning an optical code engraved on an artifact in the form of a steel pellet embedded in an article of manufacture, and wherein the optical code is captured and scanned by a phone camera using a camera lens attachment comprising an elongated neck in order to bring an eyepiece in close proximity with the artifact;
decoding the optical code to determine a unique code;
transmitting the unique code to the authentication server; and
receiving a result of authentication from the authentication server.

6. A non-transitory computer readable storage medium, having stored thereon, a set of computer-executable instructions that causes a computer to perform the steps comprising:
capturing and scanning an optical code engraved on an artifact in the form of a steel pellet embedded in an article of manufacture, and wherein the optical code is captured and scanned by a phone camera using a camera lens attachment comprising an elongated neck in order to bring an eyepiece in close proximity with the artifact;
decoding the optical code to determine a unique code;
transmitting the unique code to the authentication server; and
receiving a result of authentication from the authentication server.

* * * * *